(No Model.)
F. E. BOWMAN.
STRAINER COVER FOR SPRINKLING TANKS.
No. 493,965. Patented Mar. 21, 1893.
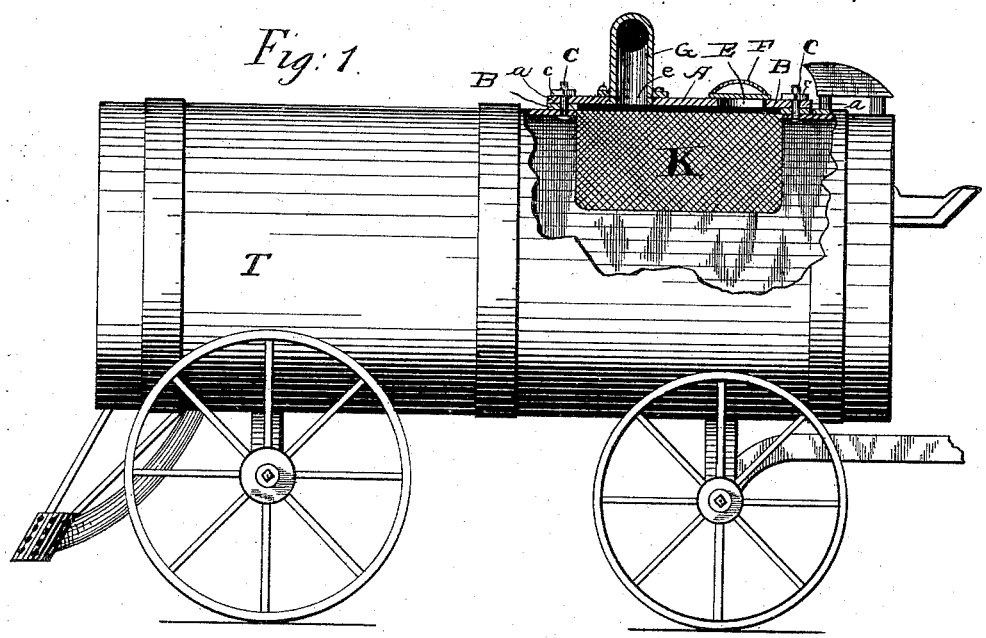
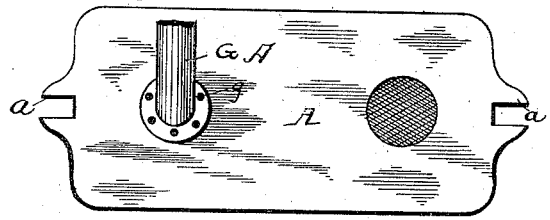
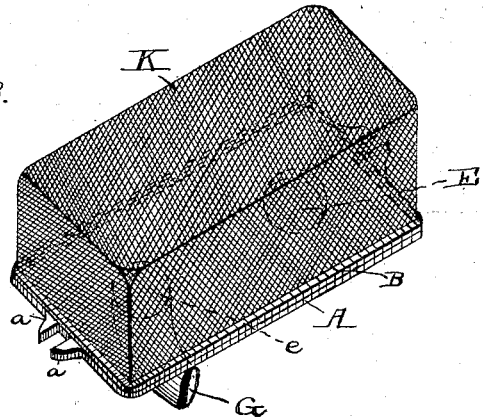
WITNESSES
Jas. R. Mansfield
C. W. Seville
INVENTOR
F. E. Bowman
by Alexander & Dowell
Attorneys.

UNITED STATES PATENT OFFICE.

FREDERICK E. BOWMAN, OF SOUTH BEND, INDIANA.

STRAINER-COVER FOR SPRINKLING-TANKS.

SPECIFICATION forming part of Letters Patent No. 493,965, dated March 21, 1893.

Application filed May 12, 1892. Serial No. 432,767. (No model.)

*To all whom it may concern:*

Be it known that I, FREDERICK E. BOWMAN, of South Bend, in the county of St. Joseph and State of Indiana, have invented certain new and useful Improvements in Strainer-Covers for Sprinkling-Tanks; and I do hereby declare that the following is a full, clear, and exact description thereof, reference being had to the accompanying drawings, and to the letters of reference marked thereon, which form part of this specification.

This invention is an improvement in combined strainers and manhole covers for tanks, &c., being especially designed for use with the tanks of street sprinkling machines; its object being to strain the water as it is introduced into the tank, thereby prolonging the life of the sprinkler valves and preventing clogging of the latter by impurities in the water, and to facilitate the introduction of water into the tank, by providing the cover with a nozzle that can be connected to a water supply hose or pipe, and with an opening into which the end of a water reservoir supply pipe such as used on railroads to supply the locomotive tender's tanks can be introduced, or through which all matters collecting in the strainer may be removed. The combined strainer and cover can also be readily removed from the tank if desired so that access can be had to the interior thereof.

To these ends the invention consists in the novel construction and combination of parts in the combined man-hole cover and strainer hereinafter fully described and claimed.

Referring to the drawings by letters of reference, Figure 1 represents a longitudinal vertical section through the cover and strainer as secured to the top of a tank. Fig. 2 is a top view, and Fig. 3 is a bottom perspective view thereof.

T represents the tank of a street sprinkling machine having a manhole in its top, and A designates a cover for said hole, having a rubber gland or packing B around its edge on its lower face and a pair of lugs a, a, at each end which are adapted to embrace bolts C, C, in the top of tank at the ends of the manhole. c, c, are nuts on said bolts which when tightened, bind the cover tightly to the top and the gland B forms a close water-tight joint between the cover and top of tank. This cover has two openings E, e, in it, the former being closed by a removable cap F, and the latter communicates with the interior of an elbow pipe G one end of which is flanged and secured by rivets or bolts g to the cover A over or around opening e, as shown, so that water can pass through said pipe and opening. This pipe may be provided with a valve or cock not shown which will prevent the reflux of water therethrough.

K designates the screen proper of basket form, attached to, and suspended from the under side of the cover, its upper edges being firmly secured thereto, adjoining gland B in any suitable manner. This screen is of large size, and both openings E, e, lead thereinto so that water entering either opening will fall into the screen.

In using the device, water is let into the screen from a suitable source through opening E or pipe G and before it can fall into the tank it must pass through the meshes of the screen; all large impurities are caught in the screen and retained of course, and when the impurities collect so much as to obstruct the passage of water they may be partly removed through opening E without removing the cover, and when it is desired to thoroughly cleanse or repair the screen, the cover is taken off.

It will not be actually necessary to have opening E closed, or pipe G valved, as the screen would prevent water splashing out of the openings to any annoying extent.

By preference the device is put in the top of the tank so that the strainer will be generally entirely clear of water, and not immersed therein, as would be the case if at the bottom or side of tank, and by so placing it the matters caught therein are not likely to be broken up or disintegrated by the splashing of water in the tank, nor will the strainer become clogged and foul so soon.

The device can be easily and conveniently applied or removed without disturbing the water in the tank, which may be kept filled even while the strainer is being cleansed.

By simply loosening nuts c, the cover and strainer can be lifted out and removed together, they being rigidly united, the cover fastenings serve to secure the strainer in place, and no interior nuts or other fastenings have to be loosened in order to remove the strainer.

Having described my invention, what I claim as new, and desire to secure by Letters Patent thereon, is—

1. The combination with a tank having a man-hole, of a cover for said man-hole having a filling opening and a cleaning out opening in it, and a basket screen rigidly secured to the underside of said cover and removable therewith, extending under both openings and adapted to depend into the tank when the cover is in position, and a cap closing said cleaning out opening, substantially as and for the purpose described.

2. The combination with the tank having a man-hole, of a man-hole cover having two openings in it and means for securing it tightly over the man-hole, a depending basket screen fixed to the underside of the cover and underlying both openings, a pipe joint fixed to the top side of the cover over one opening, and a cap closing the other opening, substantially as specified.

3. In a combined man-hole cover and strainer the combination of the plate A having lugs $a$, $a$, at its ends and openings E, $e$, a pipe joint secured over opening $e$, and a cap F closing opening E; with a basket screen K attached to the underside of the cover, and the packing gland B attached to the underside of the cover around and exterior to the edges of the basket screen, substantially as and for the purpose set forth.

In testimony that I claim the foregoing as my own I affix my signature in presence of two witnesses.

FREDERICK E. BOWMAN.

Witnesses:
J. DUSHANE,
H. H. HUMPHREY.